(12) United States Patent
Smith et al.

(10) Patent No.: US 7,497,156 B2
(45) Date of Patent: Mar. 3, 2009

(54) FLUID MOTOR

(75) Inventors: David P. Smith, Reddick, IL (US); Eric R. Lauterbach, Joliet, IL (US); Daniel T. Mather, Lockport, IL (US); Jonathan L. Buelow, Woodridge, IL (US)

(73) Assignee: Caterpillar Inc., Peoria, IL (US)

( * ) Notice: Subject to any disclaimer, the term of this patent is extended or adjusted under 35 U.S.C. 154(b) by 121 days.

(21) Appl. No.: 11/589,778

(22) Filed: Oct. 31, 2006

(65) Prior Publication Data

US 2008/0098882 A1 May 1, 2008

(51) Int. Cl.
*F16H 31/00* (2006.01)
*F16D 43/00* (2006.01)

(52) U.S. Cl. .................. 92/68; 192/41 A; 192/45.1

(58) Field of Classification Search .......... 91/345, 91/346, 348, 352, 354; 92/68; 192/41 A, 192/45.1, 72, 85 AT
See application file for complete search history.

(56) References Cited

U.S. PATENT DOCUMENTS

| | | | |
|---|---|---|---|
| 5,482,144 A | 1/1996 | Vranish | |
| 5,518,094 A | 5/1996 | Myrick | |
| 5,586,434 A * | 12/1996 | Okubo et al. | 60/345 |
| 5,967,267 A | 10/1999 | Vranish | |
| 6,502,393 B1 | 1/2003 | Stephenson et al. | |
| 6,536,571 B1 | 3/2003 | Myrick | |
| 6,584,769 B1 | 7/2003 | Bruun | |
| 6,640,949 B1 | 11/2003 | Vranish | |
| 6,651,545 B2 | 11/2003 | Nippert | |
| 6,748,738 B2 | 6/2004 | Smith | |
| 6,848,254 B2 | 2/2005 | Du | |
| 6,935,114 B2 | 8/2005 | Hajek et al. | |
| 6,997,295 B2 * | 2/2006 | Pederson et al. | 192/41 A |

FOREIGN PATENT DOCUMENTS

| | | |
|---|---|---|
| DE | 1 208 137 | 12/1965 |
| EP | 0 522 289 | 1/1993 |
| GB | 1 451 653 | 10/1976 |
| JP | 1-266305 | 10/1989 |

OTHER PUBLICATIONS

PCT Search Report for Application No. PCT/US2007/020880 indicating completion of search on Feb. 27, 2008 (6 pages).

* cited by examiner

*Primary Examiner*—Thomas E Lazo
(74) *Attorney, Agent, or Firm*—Finnegan, Henderson, Farabow, Garrett & Dunner

(57) ABSTRACT

A fluid motor including an inner race and an outer race is disclosed. The inner and outer races are configured to rotate about a substantially common axis. The motor also includes at least one fluid actuator configured to produce substantially linear motion as a function of selectively receiving pressurized fluid. The fluid motor also includes at least one sprag configured to rotate the inner and outer races about the axis as a function of the substantially linear motion.

24 Claims, 4 Drawing Sheets

FLUID MOTOR

CROSS REFERENCED APPLICATIONS

This application is related to co-pending application titled "Fluidly Actuated Sprag" filed Oct. 31, 2006 and having a patent application Ser. No. of 11/589,962.

TECHNICAL FIELD

The present disclosure relates to a motor and, more particularly, to a fluid motor.

BACKGROUND

Fluid motors typically receive a flow of pressurized fluid and convert the potential energy of the pressurized fluid into kinetic mechanical energy. Often, a fluid motor produces rotary motion configured to drive one or more operatively connected devices, e.g., gears or sprockets. A fluid pump is usually connected to the fluid motor to provide a substantially continuous flow of pressurized fluid to the fluid motor. The amount of mechanical energy output of a fluid motor is often varied by adjusting either the amount of flow and/or the pressure provided by the fluid pump, for example, by adjusting a stroke length of one or more pistons of the fluid pump or by restricting a pump provided constant flow and pressure via one or more valves disposed between the fluid pump and the fluid motor. These methods of adjusting the mechanical energy output of the fluid motor may undesirably waste energy by using only a portion of the delivered energy when adjusting the stroke length or by dissipating heat when restricting flow and pressure via the valves.

U.S. Pat. No. 6,651,545 ("the '545 patent") issued to Nippert discloses a variable displacement fluid translating device. The device of the '545 patent includes a housing, a rotary cam having an eccentric cam surface, and a plurality of pistons disposed within a plurality of piston bores disposed radially with respect to the rotational axis of the rotary cam. The eccentric cam surface is in contact with the plurality of pistons and is configured to affect a reciprocal motion of the plurality of pistons relative to a respective piston bore. The plurality of piston bores are in fluid communication with a plurality of actuators and an inlet port and an outlet port. The device of the '545 patent operates as a fluid pump by driving the rotary cam forcing the plurality of pistons to reciprocate within the plurality of piston bores and force fluid therein to the inlet or outlet port. The device of the '545 patent also operates as a fluid motor by fluidly reciprocating the plurality of pistons within the plurality of piston bores to rotate the cam via the eccentric cam surface. The device of the '545 patent may selectively adjust the amount of fluid displaced when the device operates as a fluid pump by selectively adjusting one or more of the piston strokes via the plurality of fluid actuators.

The device of the '545 patent may be configured to operate as both a fluid pump and fluid motor, however, when operating as a fluid motor, the plurality of pistons may undesirably translate a relatively large reciprocating displacement thereof into a small rotary motion of the rotary cam. Additionally, the device of the '545 patent may include adjusting the amount of rotary motion by adjusting the amount of fluid displacement, however, increased range or degree of adjustability may be desirable.

The present disclosure is directed to overcoming one or more of the shortcomings set forth above.

SUMMARY OF THE INVENTION

In one aspect, the present disclosure is directed to a fluid motor including an inner race and an outer race. The inner and outer races are configured to rotate about a substantially common axis. The motor also includes at least one fluid actuator configured to produce substantially linear motion as a function of selectively receiving pressurized fluid. The fluid motor also includes at least one sprag configured to rotate the inner and outer races about the axis as a function of the substantially linear motion.

In another aspect, the present disclosure is directed to a method of producing rotary motion. The method includes selectively supplying pressurized fluid to at least one fluid actuator to produce a reciprocal motion. The method also includes selectively actuating at least one sprag to substantially lock an inner race and an outer race for mutual rotation thereof. The method further includes transferring the linear motion from the at least one fluid actuator to the inner and outer races via the at least one sprag to rotate the inner and outer race about an axis.

In yet another aspect, the present disclosure is directed to a fluid motor including an inner, an outer race, and a plurality of sprag assemblies disposed radially between the inner and outer races. Each sprag assembly includes a pair of sprags. The fluid motor also includes a plurality of fluid actuators. Each fluid actuator is operatively associated with one of the plurality of sprag assemblies and includes a piston defining first and second fluid chambers therein. The fluid motor also includes a plurality of linkages. Each linkage is operatively associated with a respective sprag assembly and a fluid actuator and connected to each of the pair of sprags of the associated sprag assembly and the piston of the associated fluid actuator. The fluid motor further includes a plurality of first fluid paths. Each first fluid path is operatively associated with a respective sprag assembly and a fluid actuator and is configured to fluidly communicate one of the first or second fluid chambers of the associated fluid actuator with one of the pair of sprags of the associated sprag assembly.

DETAILED DESCRIPTION

Figure 1:
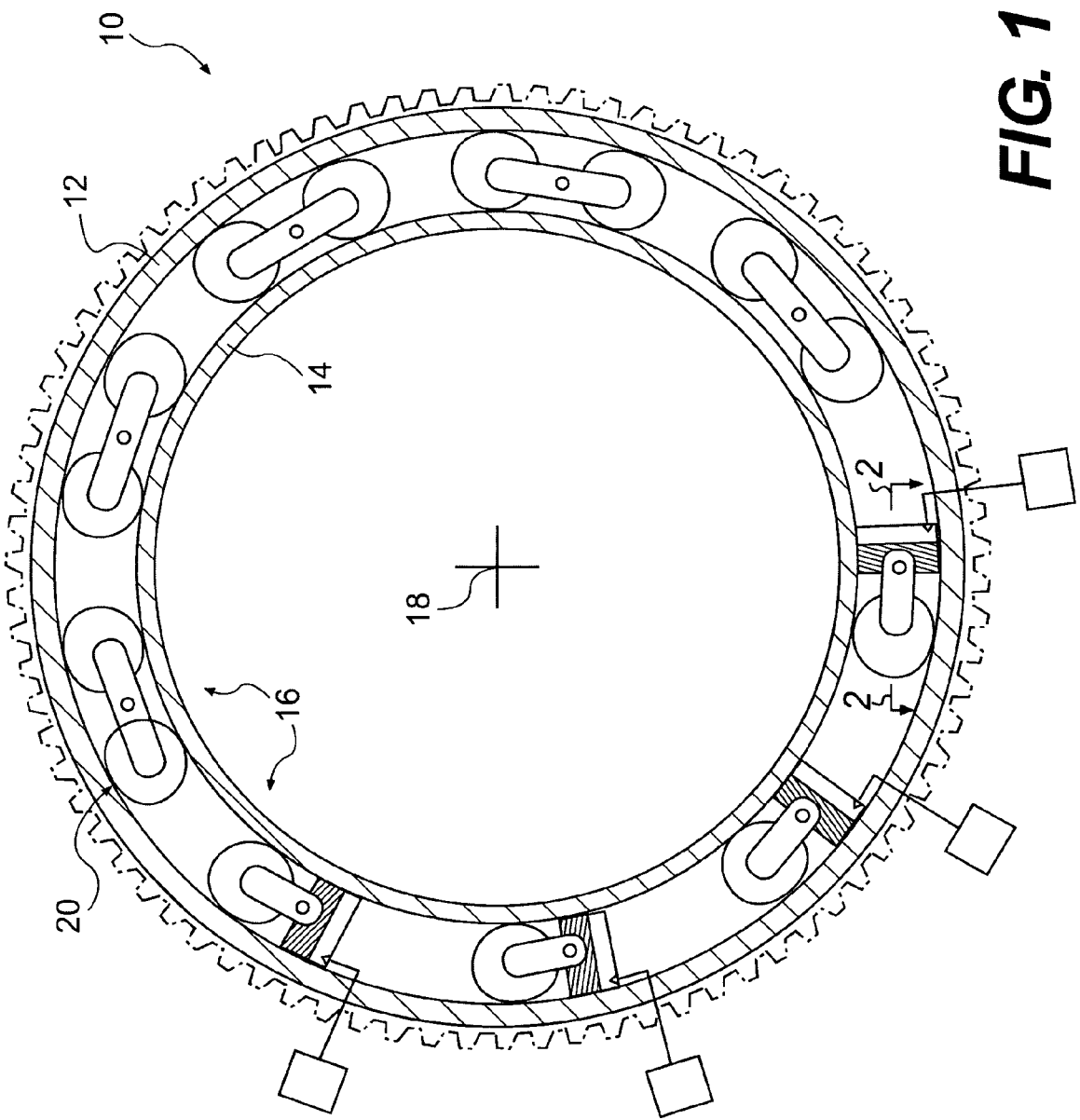
FIG. 1 is a diagrammatic side-view illustration of an exemplary fluid motor in accordance with the present disclosure.

FIG. 1 illustrates an exemplary fluid motor 10. Fluid motor 10 may include an outer race 12, an inner race 14, and a plurality of sprag assemblies 16. Fluid motor 10 may include a longitudinal axis 18 defining a rotational axis substantially about which outer race 12 and inner race 14 may be configured to rotate. Outer race 12 also may be disposed radially outward of inner race 14 and sprag assemblies 16 may be arranged between outer and inner races 12, 14. Outer race 12 may include an outer surface thereof having a toothed profile configured to mesh with one or more conventional gears. It is contemplated that inner race 14 may include an inner surface thereof having a toothed profile configured to mesh with one or more conventional gears and/or both an outer surface of outer race 12 and an inner surface of inner race 14 may have toothed profiles. It is further contemplated that outer and inner races 12, 14 may be configured to be connected directly to a shaft, e.g., welded to the shaft, connected to a sprocket, e.g., configured as a friction or toothed pulley, and/or configured to be connected to any other device to which rotary motion is desired to be delivered and connected via any manner known in the art.

As will be explained below in detail, each of sprag assemblies 16 may be selectively fixed to outer and inner races 12, 14 to cause substantially mutual rotation of outer and inner races 12, 14 about axis 18. This mutual rotation of outer and inner races 12, 14 may be a function of pressurized fluid selectively supplied to one or more of sprag assemblies 16. It is contemplated that adjusting the amount, pressure, and timing of the pressurized fluid selectively supplied to sprag assemblies 16, may establish a variable rotational output from fluid motor 10.

Figure 2:
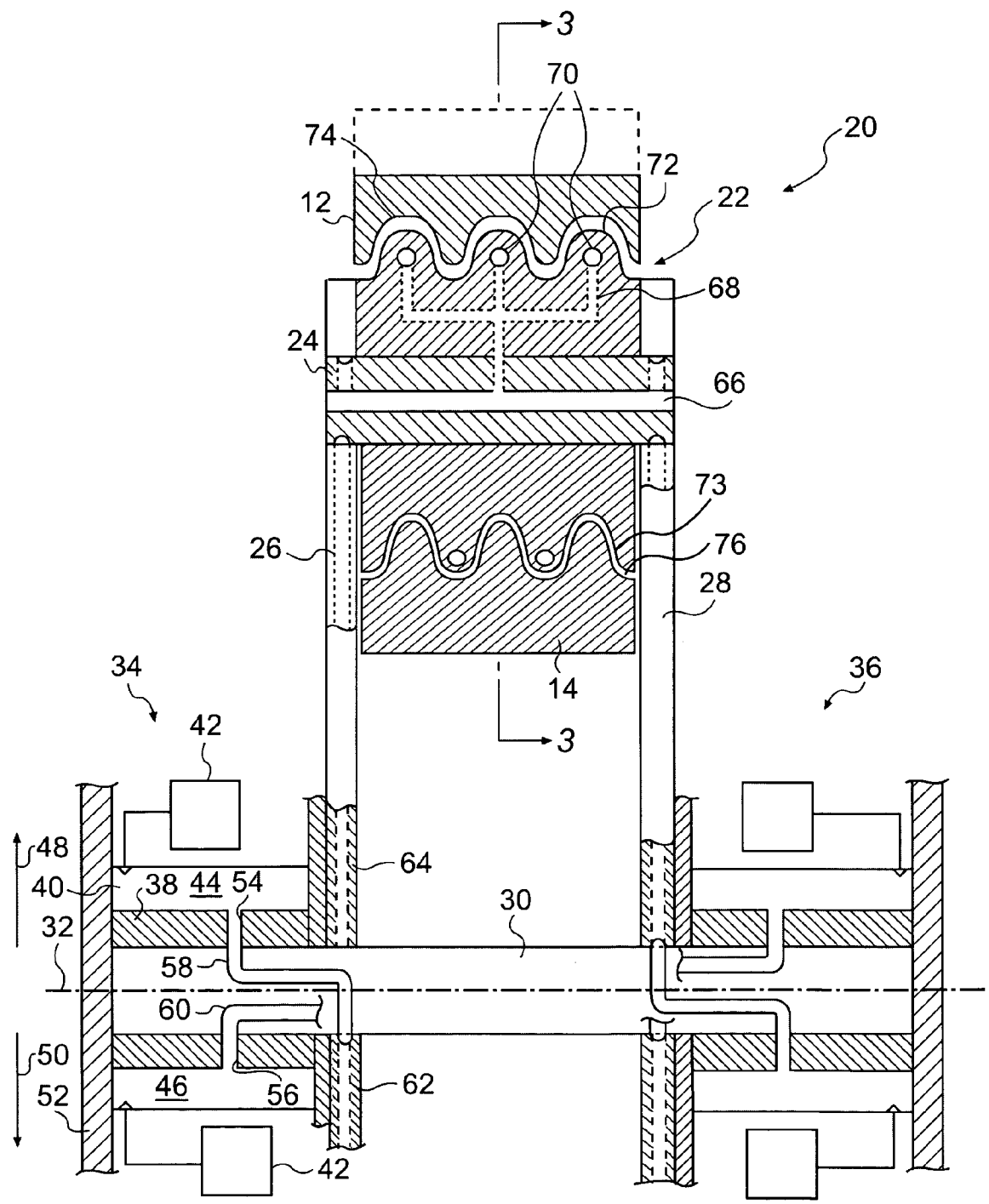
FIG. 2 is a diagrammatic sectional illustration of a sprag assembly along view 2-2 of the fluid motor of FIG. 1.

FIG. 2 illustrates a partial view of a first sprag assembly 20 taken along view 2-2 of FIG. 1. First sprag assembly 20 may include a first sprag 22 rotationally supported on a first sprag pin 24 that may be fixedly connected at opposite ends thereof to first ends of first and second links 26, 28. First and second links 26, 28 may be connected at a substantially center location thereof to an actuator pin 30. A longitudinal axis 32 of actuator pin 30 may define a sprag assembly center line about which first sprag assembly 22 may be substantially symmetrical. That is, first and second links 26, 28 may be connected at second ends thereof to a second sprag pin supporting a second sprag (not illustrated). It is contemplated that first and second links 26, 28 may include any shape, e.g., elongate, and may be fixed to first sprag pin 24 and the second sprag pin (not illustrated) via any suitable method, e.g., cotter pin, stamped, welded, or brazed.

First sprag assembly 22 may also include first and second actuator assemblies 34, 36 configured to actuate and displace first sprag 22. First actuator assembly 24 may include a piston 38 operatively connected to actuator pin 30 and configured to reciprocate within a cylinder 40 operatively connected to a housing 52. Piston 38 may reciprocate within cylinder 40 as a function of pressurized fluid selectively supplied to cylinder 40 on opposite sides of piston 38. Specifically, piston 38 may be disposed within cylinder 40 and may define first and second fluid chambers 44, 46. Pressurized fluid may be selectively supplied to first and second fluid chambers 44, 46 in any suitable manner, such as, via a hydraulic circuit 42. For example, hydraulic circuit 42 may include a source of pressurized fluid (not illustrated), a fluid reservoir (not illustrated), and at least one valve (not illustrated) configured to selectively fluidly connect first and second chambers 44, 46 with either the source of pressurized fluid or the fluid reservoir. It is contemplated that the source of pressurized fluid and/or the fluid reservoir may include an accumulator.

As is known in the art, piston 38 may be urged toward a first direction 48 with respect to housing 52 if second fluid chamber 46 is fluidly connected to the source of pressurized fluid and first fluid chamber 44 is fluidly connected with the reservoir. Conversely, piston 38 may be urged toward a second direction 50 with respect to housing 52 if first fluid chamber 44 is fluidly connected with the source of pressurized fluid and second chamber 46 is fluidly connected with the reservoir. It is contemplated that second fluid actuator 36 may be substantially similar to first fluid actuator 34 in structure and operation and thus is not further described. It is also contemplated that first and second fluid actuators 34, 36 may include any type of piston-cylinder arrangement known in the art and housing 52 may or may not form a structural part thereof. It is further contemplated that the stroke of piston 38, e.g., the reciprocal motion of piston 38 with respect to cylinder 40, may be any length.

Piston 38 may also include first and second fluid passageways 54, 56 disposed therein and configured to fluidly communicate pressurized fluid selectively supplied to first and second fluid chambers 44, 46 toward third and fourth fluid passageways 58, 60, respectively. Third and fourth fluid passageways 58, 60 may be disposed within actuator pin 30 and configured to fluidly communicate pressurized fluid from first and second fluid passageways 54, 56 toward first and second link passageways 62, 64, respectively. Second link passageway 64 may be disposed within first link 26 and configured to fluidly communicate pressurized fluid from second and fourth fluid passageways 56, 60, and thus second fluid chamber 46, toward sprag pin passageway 66. First link passageway 62 may also be disposed within first link 26 and configured to fluidly communicate pressurized fluid toward a sprag pin passageway disposed in the second sprag pin (not illustrated). As such, second fluid passageway 56, fourth fluid passageway 60, second link passageway 62 and sprag pin passageway 66 may establish a first fluid path configured to communicate pressurized fluid selectively supplied to second fluid chamber 46 toward first sprag 22. It is contemplated that first fluid passageway 54, third fluid passageway 58, first link passageway 62, and the sprag pin passageway disposed within the second sprag pin (not illustrated) may define a second fluid path configured to communicate pressurized fluid selectively supplied to first fluid chamber 44 toward the second sprag. It is also contemplated that the fluid connections between any of the fluid communicating passageways may include any type of fluid connection known in the art, such as, for example, a partial or full circumferential groove disposed adjacent an end of an upstream or downstream passageway.

First sprag 22 may be rotationally supported on sprag pin 24 and may include a sprag passageway 68 disposed therein and in fluid communication with sprag pin passageway 66. Sprag passageway 68 may be configured to communicate pressurized fluid from sprag pin passageway 66 toward one or more sprag actuators 70. First sprag 22 may also include one or more ridges 72, 73 on an outer surface thereof. Ridges 72, 73 may be complimentary in shape and configured to selectively engage grooves 74, 76 disposed on the inner surface of outer race 12 and the outer surface of inner race 14, respectively. It is contemplated that ridges 72, 73 and grooves 74, 76 may include any quantity and/or any shape, e.g., arcuate, triangular, square or rectangular stepped, and may be regularly or irregularly spaced with respect to an axial axis of first sprag 22. It is also contemplated that ridges 73 may be staggered with respect to ridges 72 according to any amount of offset therebetween. It is further contemplated that the description above and below with respect to first sprag 22 is equally applicable to each sprag of the plurality of sprag assemblies 16.

Figure 3:
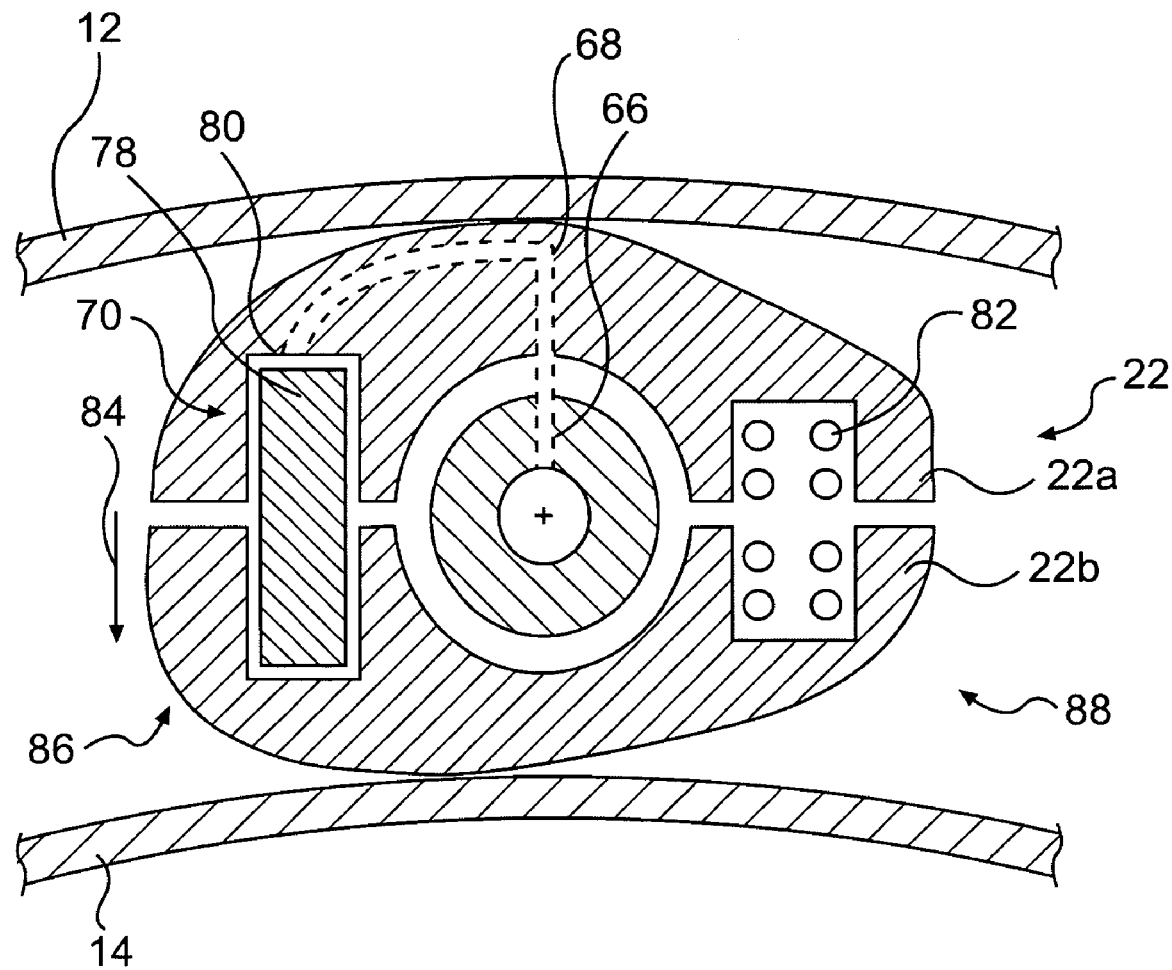
FIG. 3 is a diagrammatic side-view illustration of a sprag along view 3-3 of the sprag assembly of FIG. 2.

FIG. 3 illustrates an side-view of first sprag 22 taken along line 3-3 of FIG. 2. Each of sprag actuators 70 may include a piston 78 configured to reciprocate within a cylinder 80 as a function of pressurized fluid selectively supplied to cylinder 80 from sprag passageway 68. First sprag 22 may additionally include a first part 22a and a second part 22b and movement of piston 78 within cylinder 80 in a first direction 84 may urge first part 22a away from second part 22b and thus cause first sprag 22 to frictionally engage and substantially lock outer and inner races 12, 14 together. First sprag 22 may further include a plurality of springs 82 (only one of which is illustrated) configured to oppose the movement of piston 78 within cylinder 80 in the first direction 84 and urge first part 22a away from second part 22b. First sprag 22 may be oblong in shape including a first or long dimension end 86 in which actuators 70 may be disposed and a second or short dimension end 88 in which springs 82 may be disposed. As such, movement of piston 78 in first direction 84 may overcome the bias of springs 80 and may urge first and second parts 22a, 22b away from one another expanding the long dimension end 86 and thus fixedly engaging sprag 22 with outer and inner races 12, 14. Conversely, springs 80 may urge first and second parts 22a, 22b away from one another expanding the short dimension end 88 when pressurized fluid is selectively not supplied to cylinder 78, which may not fixedly engage sprag 22 with outer and inner races 12, 14. It is contemplated that the size of long dimension end 86 and short dimension end 88 may be any desired length to achieve any desired amount of fixed engagement and/or non-engagement of sprag 22 with respect to outer and inner races 12, 14. It is also contemplated that actuators 70 may, alternatively, include any type of actuator and springs 80 may include any type of biasing element configured to urge first and second parts 22a 22b toward outer and inner races 12, 14. It is further contemplated that first sprag 22 may include any quantity of actuators 70 and springs 82, e.g., three, and may or may not include the same quantity of actuators 70 and springs 82.

Figure 4:
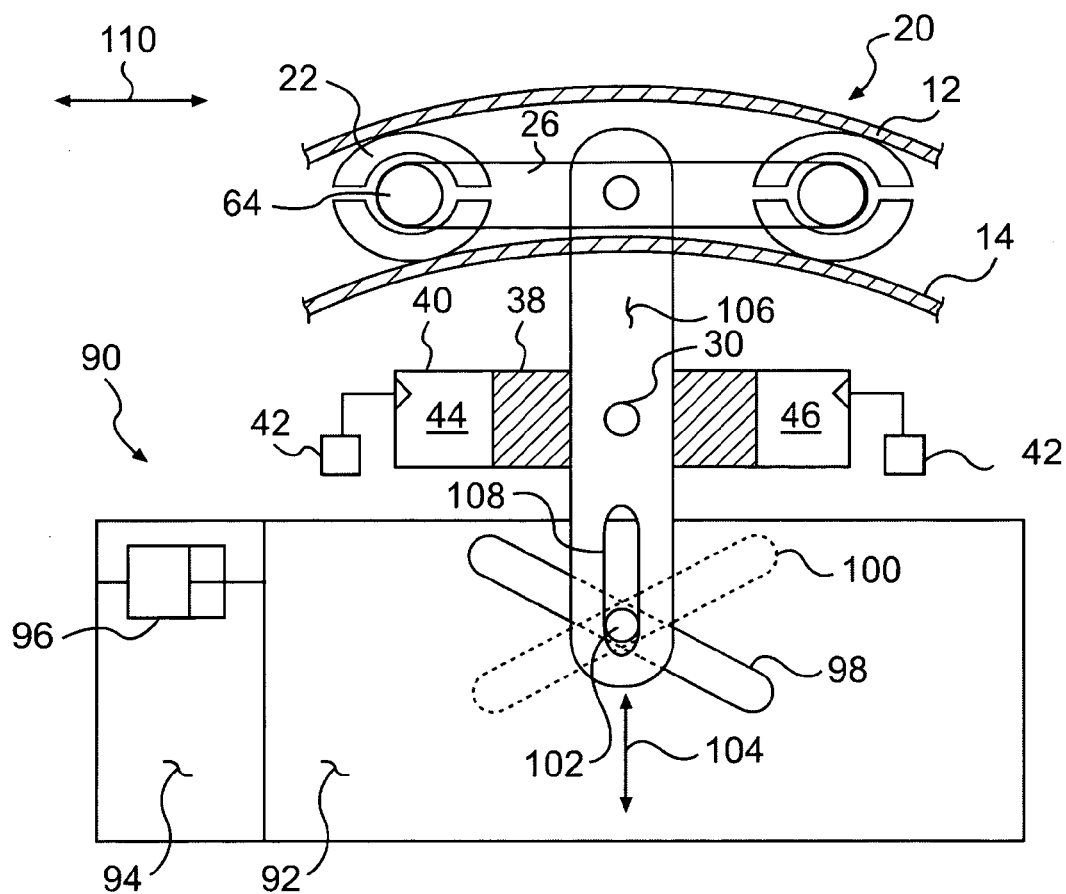
FIG. 4 is a diagrammatic side-view illustration of an exemplary adjustment mechanism for the sprag assembly of the fluid motor of FIG. 1.

FIG. 4 illustrates an exemplary adjustment mechanism 90 configured to vary the amount of movement of piston 38 transferred to first and second links 26, 28. Specifically, adjustment mechanism 90 may include first and second adjusting plates 92, 94 configured to be movable with respect to one another via an adjusting actuator 96. Adjusting actuator 96 may include a piston-cylinder arrangement connected at one end thereof to first adjusting plate 92 and another end thereof connected to second adjusting plate 94. As such, actuation, e.g., extension and retraction of adjusting actuator 96, may cause first and second adjusting plates 92, 94 to move relative to one another. Movement between plates 92 and 94 may cause a first slot 98 disposed within first adjusting plate 92 to move relative to a second slot 100 disposed within second adjusting plate 94. First slot 98 may be disposed substantially at an angle with respect to second slot 100 and arranged so as to at least partially overlap second slot 100. For example, first and second slots 98, 100 may form a substantially "X" shape. It is contemplated that first and second slots 98, 100 may be any shape, e.g., substantially linear or arcuate.

Adjustment mechanism 90 may also include a pivot pin 102 disposed within first and second slots 98, 100 and configured to reciprocate along a pivot direction 104. Specifically, pivot pin 102 may be configured to move as a function of first adjusting plate 92 moving relative to second adjusting plate 94. For example, as adjusting actuator 96 extends, first and second adjusting plates 92, 94 may move in a first direction resulting in pivot pin 102 moving along pivot direction 104 toward sprag assembly 20 as first and second slots 98, 100 overlap at progressively different locations. Similarly, as adjusting actuator 96 retracts, first and second adjusting plates 92, 94 may move in a second direction resulting in pivot pin 102 moving along pivot direction 104 away from sprag assembly 20 as first and second slots 98, 100 overlap at progressively different locations.

Adjustment mechanism 90 may also include a pivot link 106 pivotally connected at a first end thereof to pivot pin 102 via a slot 108, pivotally connected at a second end thereof to link 26, and pivotally connected at a location between the first and second ends to actuator pin 30. As such, movement of piston 38 as a function of pressurized fluid selectively supplied to first or second fluid chambers 44, 46 may result in pivot link 106 pivoting about pivot pin 102 and thus causing link 26 to reciprocate along a direction 110 substantially perpendicular to pivot direction 104. For example, pivot link 106 may act as an adjustable lever arm configured to transfer reciprocal movement of piston 38 to reciprocal movement of link 26 as a function of the position of pivot pin 102, which in turn may be adjusted by adjustment actuator 96 moving first and second adjustment plates 92, 94 relative to one another. It is contemplated that the ratio of lengths of slot 108 and pivot pin 106 may provide a range of lever arm ratios to provide a range of ratios between piston 38 movement and link 26 movement. It is also contemplated that the length of pivot link 106 and slot 108 may be any desired length and may be configured to provide any lever arm ratio. For example, the ratio of the length of slot 108 to the length of pivot link 106 may be approximately 1:2 to provide an adjustable lever arm ratio from a maximum amount of the movement of piston 38 transferred to link 26 to approximately half of the movement of piston 38 transferred to link 26. It is contemplated that link 26 may, alternatively, include a plurality of links and may or may not be configured to pivot about actuator pin 30.

Figure 5:
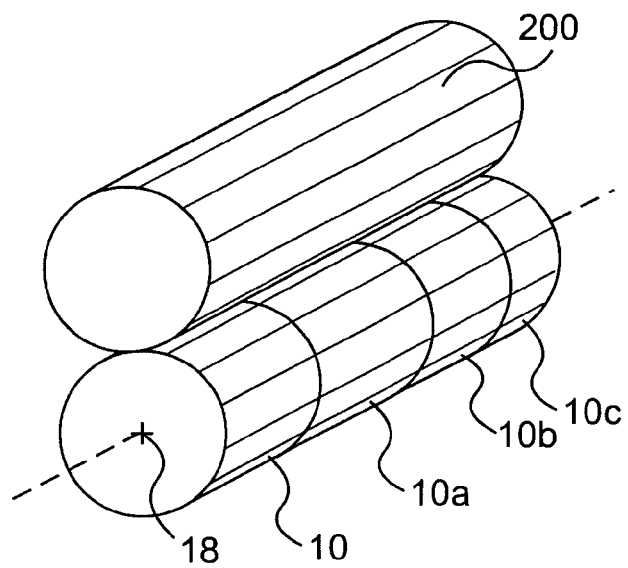
FIG. 5 is a diagrammatic illustration of the fluid motor of FIG. 1 operatively connected to an output.

FIG. 5 illustrates fluid motor 10 operatively connected to an output 200. Specifically, fluid motor 10 may be operatively connected to output 200 via gear teeth disposed on the outer surface of outer race 12. The structure and operation of gear teeth is well known in the art and, as such, is not further explained. Additionally, a plurality of fluid motors 10, 10a, 10b, 10c may each be operatively connected to output 200. Fluid motors 10a, 10b, 10c may be substantially similar to fluid motor 10 and may be similarly configured to provide rotary motion. As such, fluid motors 10, 10a, 10b, 10c may together establish a combined fluid motor configured to impart rotary motion to output 200. It is contemplated that any quantity of fluid motors 10, 10a, 10b, 10c may be operatively connected to output 200 and may or may not be connected in series with each other.

INDUSTRIAL APPLICABILITY

The disclosed fluid motor 10 may be applicable to system where rotary motion is desired. Fluid motor 10 may convert hydraulic potential energy into mechanical kinetic energy and may be configured to provide a localized rotary motion to one or more components. The operation of fluid motor 10 is explained below.

Referring to FIGS. 1 and 4, fluid motor 10 may be operatively connected to output 200 and configured to rotate output 200. For example, output 200 may be a gear, sprocket, or other suitable output device connected to fluid motor 10 via any suitable connection, e.g., directly meshing gear teeth or a belt. Alternatively, output 200 may be directly connected to one or more components of fluid motor 10, e.g., a shaft directly connected to inner race 14. As such, fluid motor 10 may be configured to rotate output 200 in either a clockwise or a counter-clockwise direction and in either drive or retarding load conditions.

Referring to FIG. 2, pressurized fluid may be selectively communicated from hydraulic circuit 42 toward first and second fluid chambers 44, 46 to displace piston 38 in either direction 50 or direction 48. Specifically, pressurized fluid may be delivered to second fluid chamber 46 to move piston 38 in direction 48. Additionally, pressurized fluid communicated to second fluid chamber 46 may be communicated along the first fluid path, e.g., passageways 56, 60, 64, communicated to sprag pin passageway 66, sprag passageway 68, and to actuators 70. Each of pistons 78, e.g., the piston for each of actuators 70, may move in direction 84 and expand the large dimension end of first sprag 22 and thus lock outer and inner races 12, 14 together. With first sprag 22 locking outer and inner races 12, 14 and first sprag 22 connected to actuator pin 30 and thus piston 38 via a linkage system, e.g., link 26, movement of piston 38 resulting from pressurized fluid communicated to second fluid chamber 46 may urge sprag 22 in a substantially linear direction with respect to axis 18 (see FIG. 1) and thus cause outer and inner races 12, 14 to rotate about axis 18. That is, movement of piston 38 may be transferred to first sprag 22 and thus to outer and inner races 12, 14 tangentially to axis 18. It is contemplated that pistons 78 may actuate first sprag 22 to engage and lock outer and inner races 12, 14 substantially at the same time as the pressurized fluid communicated to second fluid chamber 46 moves piston 38 in direction 48. It is also contemplated that movement of piston 38 in direction 48 may correspond to a counter-clockwise direction of outer and inner races 12, 14 and thus of fluid motor 10 (see FIG. 1.).

Movement of fluid motor 10 in a clockwise direction may be established by selectively communicating pressurized fluid to first fluid chamber 44, the second fluid path, e.g., passageways 54, 58, 62, the sprag pin passageway of the second sprag, and communicated to the sprag passageway of the second sprag and the respective actuators therein. It is contemplated that the operation of the second sprag is substantially similar to that of first sprag 22 and as such is not further explained. It is also contemplated that pressurized fluid may be selectively and substantially simultaneously supplied to respective first fluid chambers, e.g., fluid chambers 44 or 46, of both first and second fluid actuators 34, 36, along first and second fluid paths, and combined within respective sprag pin passageways, e.g., sprag pin passageway 66, for selective communication to respective sprags, e.g., first sprag 22.

Referring again to FIG. 1, pressurized fluid may be selectively supplied to additional sprag assemblies 16. For example, pressurized fluid may be supplied to the next adjacent counter-clockwise sprag assembly with respect to first sprag assembly 22 to further rotate outer and inner races 12, 14 in the counter-clockwise direction. As such, pressurized fluid may be selectively supplied to fluid chambers in the fluid actuator respectively associated with the next adjacent counter-clockwise sprag assembly similarly to that as explained above with respect to first sprag 22. Thus, first sprag assembly 22 may rotate outer and inner races 12, 14 a first degree of rotation about axis 18, e.g., 40 degrees, and the next adjacent counter-clockwise sprag assembly may rotate outer and inner races 12, 14 a second degree of rotation about axis 18, e.g., 40 degrees. It is contemplated that subsequent actuation of adjacent counter-clockwise sprag assemblies may also rotate outer and inner races 12, 14 subsequent degrees of rotation to achieve any number of degrees of rotational movement of outer and inner races 12, 14, e.g., 360 degrees. It is also contemplated that similar actuation of adjacent clockwise sprag assemblies may rotate outer and inner races 12, 14 in a clockwise direction similar to the manner in which outer and inner races 12, 14 may be rotated in the counter-clockwise direction. It is further contemplated that subsequent actuation of each of the sprag assemblies 16 may establish an actuation sequence that may be repeated any number of times to substantially continuously rotate outer and inner races 12, 14.

Selectively omitting the actuation one or more of the sprag assemblies 16 during actuation sequences may provide an adjustability of the rotational output fluid motor 10. For example, actuation of all sprag assemblies 16 may provide a maximum rotational output torque of fluid motor 10, selectively omitting one or more of sprag assemblies 16 may provide decreased rotational output torque of fluid motor 10, and actuating only one of sprag assemblies 16 may provide a minimum rotational output torque of fluid motor 10. It is contemplated that rotational output speed of motor 10 may inversely correspond to the rotational output torque. For example, if fluid motor 10 includes nine sprag assemblies 16, selectively omitting one or more sprag assemblies 16 may provide nine step change ratios, e.g., 9:9, 8:9, 7:9, 6:9, 5:9, 4:9, 3:9, 2:9, and 1:9, each corresponding to the rotational degree each sprag assembly rotates outer and inner races 12, 14 and the combined rotational output, e.g., torque and speed, for an actuation sequence. It is also contemplated that the different step change ratios may be achieved by selectively not supplying pressurized fluid to one or more of the fluid actuators, e.g., fluid actuators 34 and 36, associated with a respective sprag assembly, e.g., first sprag assembly 22, during a particular actuation sequence.

Referring to FIG. 4, the various step change ratios of fluid motor 10 may be further varied by adjustment mechanism 90 as a function of the ratio of slot 108 to lever arm 106. For example, if the ratio of slot 108 to lever arm 106 is 1:2, fluid motor 10 may include a continuously variable output ratio from a maximum output to approximately one half a corresponding rotational degree a sprag assembly rotates outer and inner races 12, 14, e.g., ½ of 40 degrees or 20 degrees. For example, if fluid motor 10 includes nine sprag assemblies 16 and thus nine step change ratios, selective actuation of adjustment plates 92, 94 and thus the ratio of lever arm 106 may provide substantially continuously variable ratios between the maximum ratio, e.g., 9:9, and the minimum ratio, e.g., 1:9. Specifically, the position of pivot 102 may be adjusted to reduce the effective length of pivot arm 106, and thus the amount of movement of piston 38 transferred to outer and inner races 12, 14, without selectively omitting actuation of one or more sprag assemblies 16. That is, actuating nine sprag assemblies and adjusting pivot 102 from a maximum lever arm to a ⅞ths lever arm may provide a substantially continuous ratio from 9:9 to 8:9 or the actuation of only eight of the nine sprag assemblies. Actuation of eight sprag assemblies and adjusting pivot 102 from the maximum lever arm to a ⅞ths lever arm may provide a substantially continuous ratio from 9:8 to 7:9 or the actuation of only seven of the nine sprag assemblies. Subsequent actuation of fewer sprag assemblies and similarly adjusting pivot 102 to vary the lever arm to a corresponding fraction may provide substantially continuously variable output to a minimum of ½ of the actuation of one sprag assembly, e.g., actuating only one of the nine sprag assemblies and adjusting pivot 102 to vary the lever arm from a maximum to a ½ lever arm. It is contemplated that fluid motor may include any quantity of sprag assemblies 16 and the timing associated with selectively supplying pressurized fluid thereto may be adjusted to provide a substantially continuous rotary motion of outer and inner races 12, 14. It is also contemplated that the various step changes of motor 10 may be further varied by adjusting the displacement stroke of piston 38 via hydraulic circuit 42.

Referring again to FIG. 4, multiple fluid motors 10, 10a, 10b, 10c may be connected to output 200 to further increase the continuousness of rotary motion delivered thereto. Specifically, the timing of supplying pressurized fluid to one or more sprag assemblies of respective fluid motors may be staggered to further increase the continuousness of the rotary motion. For example, a first sprag assembly of fluid motor 10 may be actuated to rotate outer and inner races 12, 14, then a first sprag assembly of fluid motor 10*a* may be actuated to rotate outer and inner races thereof, then a first sprag assembly of fluid motor 10*b* may be actuated to rotate outer and inner races thereof, and then fluid motor 10*c* may be similarly actuated and the sequence repeated for subsequent sprag assemblies. It is contemplated that the first sprag assembly of a subsequent fluid motor, e.g., fluid motor 10*b*, may be actuated any time after the actuation of the first sprag assembly of a previous fluid motor, e.g., fluid motor 10. It is also contemplated that fluid motors 10, 10*a*, 10*b*, 10*c* may each include the same or different quantities of sprag assemblies. It is also contemplated that fluid motors 10, 10*a*, 10*b*, 10*c* may be actuated in any sequence and adjusted according to desired drive directions, speeds, and/or loads with respect to output 200. It is further contemplated that rotational energy may be recoverable by operatively connecting one or more of fluid motors 10, 10*a*, 10*b*, 10*c* and/or output 200 to an energy storage device such as, for example, an accumulator, a flywheel, a generator, and/or other energy storage device known in the art.

Because the sprags of fluid motor 10 tangentially convert substantially linear motion into rotary motion, fluid motor 10 may translate a significant portion of the linear movement into rotary motion. Additionally, fluid motor 10 may be directly connected to output 200 providing rotary movement locally thereto which may reduce energy losses due to remote generation of rotary movement, e.g., an engine and a crank shaft, transferred via one or more mechanical connections, e.g., transmissions and/or reduction gears, to a local output 200.

It will be apparent to those skilled in the art that various modifications and variations can be made to the disclosed fluid motor. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A fluid motor comprising:
   an inner race and an outer race, the inner and outer races configured to rotate about a substantially common axis;
   at least one fluid actuator configured to produce substantially linear motion as a function of selectively receiving pressurized fluid; and
   at least one sprag configured to rotate the inner and outer races about the axis as a function of the substantially linear; and
   at least one fluid path configured to communicate pressurized fluid from the fluid actuator to the at least one sprag.

2. The fluid motor of claim 1, further comprising:
   a plurality of grooves disposed on each of an outer surface of the inner race and an inner surface of the outer race; and
   a plurality of ridges disposed on an outer surface of the at least one sprag.

3. The fluid motor of claim 1, wherein the at least one sprag is a first sprag and the fluid motor further includes a sprag assembly including the first sprag, a second sprag, and a first link operatively connected to the first and second sprags.

4. The fluid motor of claim 3, wherein:
   the fluid actuator includes first and second chambers configured to selectively receive pressurized fluid; and
   the first sprag is configured to rotate the inner and outer races as a function of the first fluid chamber selectively receiving pressurized fluid and the second sprag is configured to rotate the inner and outer races as a function of the second fluid chamber selectively receiving pressurized fluid.

5. The fluid motor of claim 4, wherein:
   the first sprag is further configured to rotate the inner and outer races in a first direction; and
   the second sprag is further configured to rotate the inner and outer races in a second direction, opposite the first direction.

6. The fluid motor of claim 1, wherein the at least one sprag is a plurality of sprags and the at least one fluid actuator is a plurality of fluid actuators, the fluid motor further including a plurality sprag assemblies each including a first and a second sprag operatively connected via a first link, wherein:
   each of the plurality of fluid actuators includes a piston defining first and second fluid chambers within a cylinder;
   each piston of the plurality of fluid actuators is operatively associated with a respective first link of a sprag assembly and configured to move the respective first link as a function of pressurized fluid selectively supplied to the first and second fluid chambers defined by the piston;
   each of the first sprags is configured to selectively transmit motion to the inner and outer races as a function of the pressurized fluid selectively supplied to first and second fluid chambers and movement of a respective first link.

7. The fluid motor of claim 1, further including a linkage operatively connected between the at least one fluid actuator and the at least one sprag and configured to translate the substantially linear motion of the at least one actuator to the at least one sprag.

8. The fluid motor of claim 7, wherein the linkage includes an adjustable lever arm configured to vary the amount of the substantially linear motion translated to the at least one sprag.

9. A method of producing rotary motion comprising:
   selectively supplying pressurized fluid to at least one fluid actuator to produce a reciprocal motion;
   selectively communicating pressurized fluid from the at least one fluid actuator to at least one sprag;
   selectively actuating the at least one sprag to substantially lock an inner race and an outer race for mutual rotation thereof;
   transferring the linear motion from the at least one fluid actuator to the inner and outer races via the at least one sprag to rotate the inner and outer race about an axis.

10. The method of claim 9, wherein:
   the at least one fluid actuator includes a first and a second fluid chamber therein;
   selectively supplying pressurized fluid includes selectively supplying pressurized fluid to the first and second fluid chambers; and
   transferring the linear motion includes moving a link operatively connected between the at least one fluid actuator and the at least one sprag.

11. The method of claim 9, wherein the at least one fluid actuator is a plurality of fluid actuators and the at least one sprag is a plurality of sprags, each one of the plurality of fluid actuators being operatively associated with at least two sprags, the method further including:
   selectively supplying pressurized fluid to a first fluid actuator to move a first one of the at least two sprags associated therewith in a first direction; and selectively supplying pressurized fluid to a second fluid actuator to move a first one of the at least two sprags associated therewith in the first direction.

12. The method of claim 11, wherein pressurized fluid is selectively supplied to the second fluid actuator after pressurized fluid is selectively supplied to the first fluid actuator.

13. The method of claim 11, further including selectively supplying pressurized fluid to the remaining plurality of fluid actuators, one after another, to move a first one of the at least two sprags associated with a respective one of the remaining plurality of fluid actuators in the first direction.

14. The method of claim 11, wherein selectively supplying pressurized fluid to each of the plurality of fluid actuators establishes an actuation sequence and the method further includes performing a plurality of actuation sequences.

15. A fluid motor comprising:
an inner and an outer race;
a plurality of sprag assemblies disposed radially between the inner and outer races, each sprag assembly including a pair of sprags;
a plurality of fluid actuator assemblies, each being operatively associated with one of the plurality of sprag assemblies and including a first piston defining first and second fluid chambers therein;
a plurality of linkages, each linkage operatively associated with a respective sprag assembly and a fluid actuator assembly and connected to each of the pair of sprags of the associated sprag assembly and the first piston of the associated fluid actuator assembly; and
a plurality of first fluid paths, each first fluid path being operatively associated with a respective sprag assembly and a fluid actuator assembly and configured to fluidly communicate one of the first or second fluid chambers of the associated fluid actuator with one of the pair of sprags of the associated sprag assembly.

16. The fluid motor of claim 15, further including a plurality of second fluid paths, each second fluid path being operatively associated with a respective sprag assembly and a fluid actuator assembly and configured to fluidly communicate the other one of the first or second fluid chambers of the associated fluid actuator assembly with the other one of the pair of sprags of the associated sprag assembly.

17. The fluid motor of claim 15, wherein pressurized fluid is selectively supplied to the first fluid chamber of one of the plurality of fluid actuator assemblies to selectively displace the first piston and selectively actuate the sprag fluidly communicated with the first fluid chamber selectively supplied with pressurized fluid.

18. The fluid motor of claim 15, further including at least nine sprag assemblies, nine fluid actuator assemblies, and nine linkage assemblies, wherein:
pressurized fluid is selectively supplied to each one of the nine fluid actuator assemblies one after another to selectively actuate each one of the nine sprag assemblies one after another.

19. The fluid motor of claim 15, further including at least nine sprag assemblies, nine fluid actuator assemblies, and nine linkage assemblies, wherein:
pressurized fluid is selectively supplied to at least one of the nine fluid actuators to selectively actuate at least one of the nine sprag assemblies and selectively achieve a plurality of drive ratios as a function of the quantity of fluid actuators that are selectively supplied with pressurized fluid.

20. The fluid motor of claim 15, wherein the plurality of fluid actuator assemblies and the plurality of sprag assemblies are circumferentially spaced around the inner race at substantially equal intervals.

21. The fluid motor of claim 15, wherein the inner and an outer races, the plurality of sprag assemblies, the plurality of fluid actuator assemblies, and the plurality of linkages establish an assembly operatively connected to an output device, the fluid motor further comprising:
a plurality of additional assemblies each operatively connected to the output device.

22. The fluid motor of claim 15, wherein:
one of the pair of sprags is configured to translate a first movement of the first piston of the associated fluid actuator assembly into a first rotational movement of the inner and outer races;
the other one of the pair of sprags is configured to translate a second movement of the first piston of the associated fluid actuator assembly into a second rotational movement of the inner and outer races; and
the first and second rotational movements are in opposite directions.

23. The fluid motor of claim 15, wherein each of the plurality of linkages includes an adjustable lever arm connected between the first piston of the associated fluid actuator assembly and the pair of sprags of the associated sprag assembly.

24. The fluid motor of claim 15, wherein each fluid actuator assembly further includes:
two fluid actuators, the first piston is operatively associated with one of the two fluid actuators;
a second piston operatively associated with the other one of the two fluid actuators; and
a pin operatively connected to both the first and second pistons.

* * * * *